No. 807,274. PATENTED DEC. 12, 1905.
I. H. JOHNSON, Jr.
GEARING FOR LATHES OR OTHER TOOLS.
APPLICATION FILED MAR. 2, 1904.
3 SHEETS—SHEET 1.
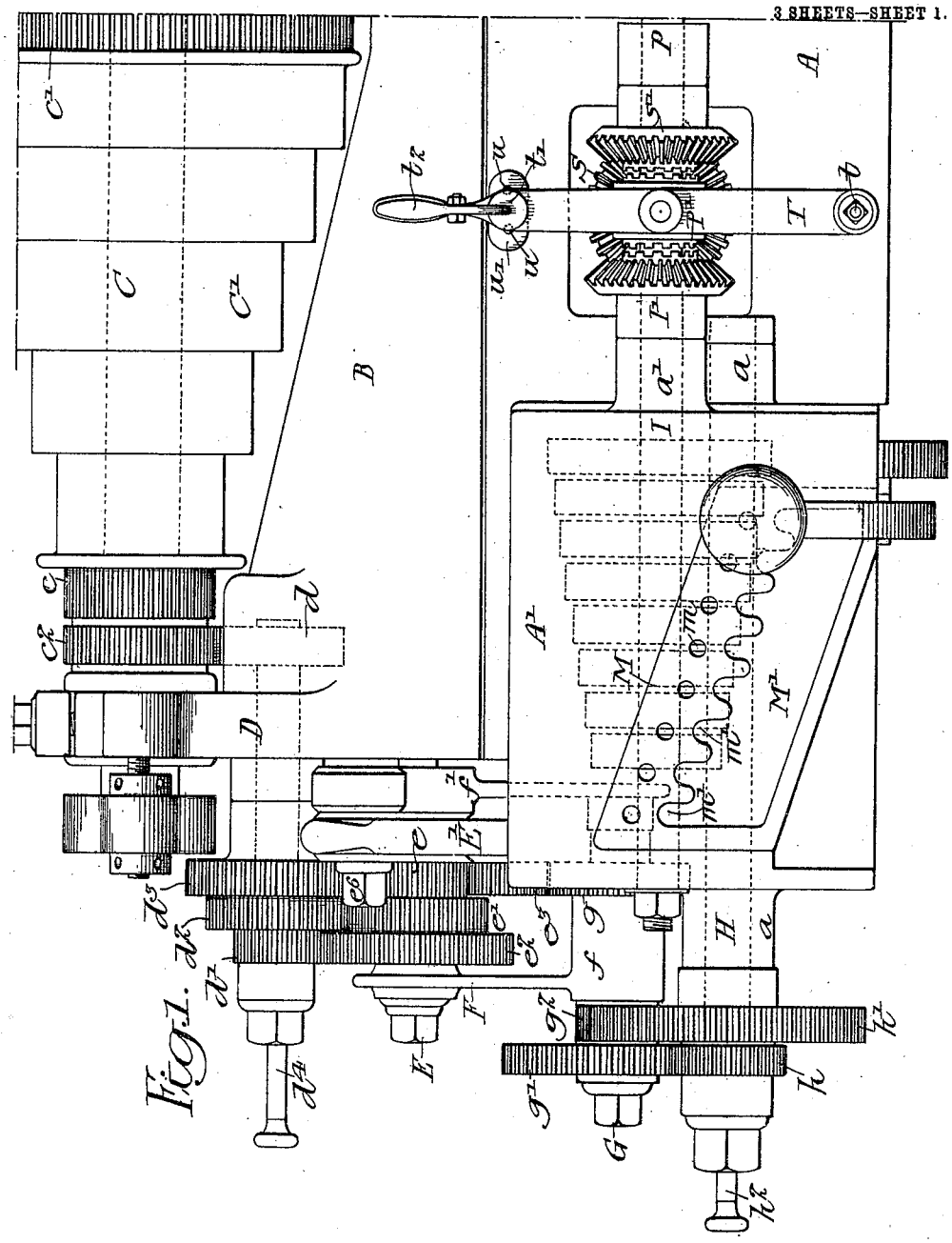

No. 807,274. PATENTED DEC. 12, 1905.
I. H. JOHNSON, Jr.
GEARING FOR LATHES OR OTHER TOOLS.
APPLICATION FILED MAR. 2, 1904.
3 SHEETS—SHEET 2.
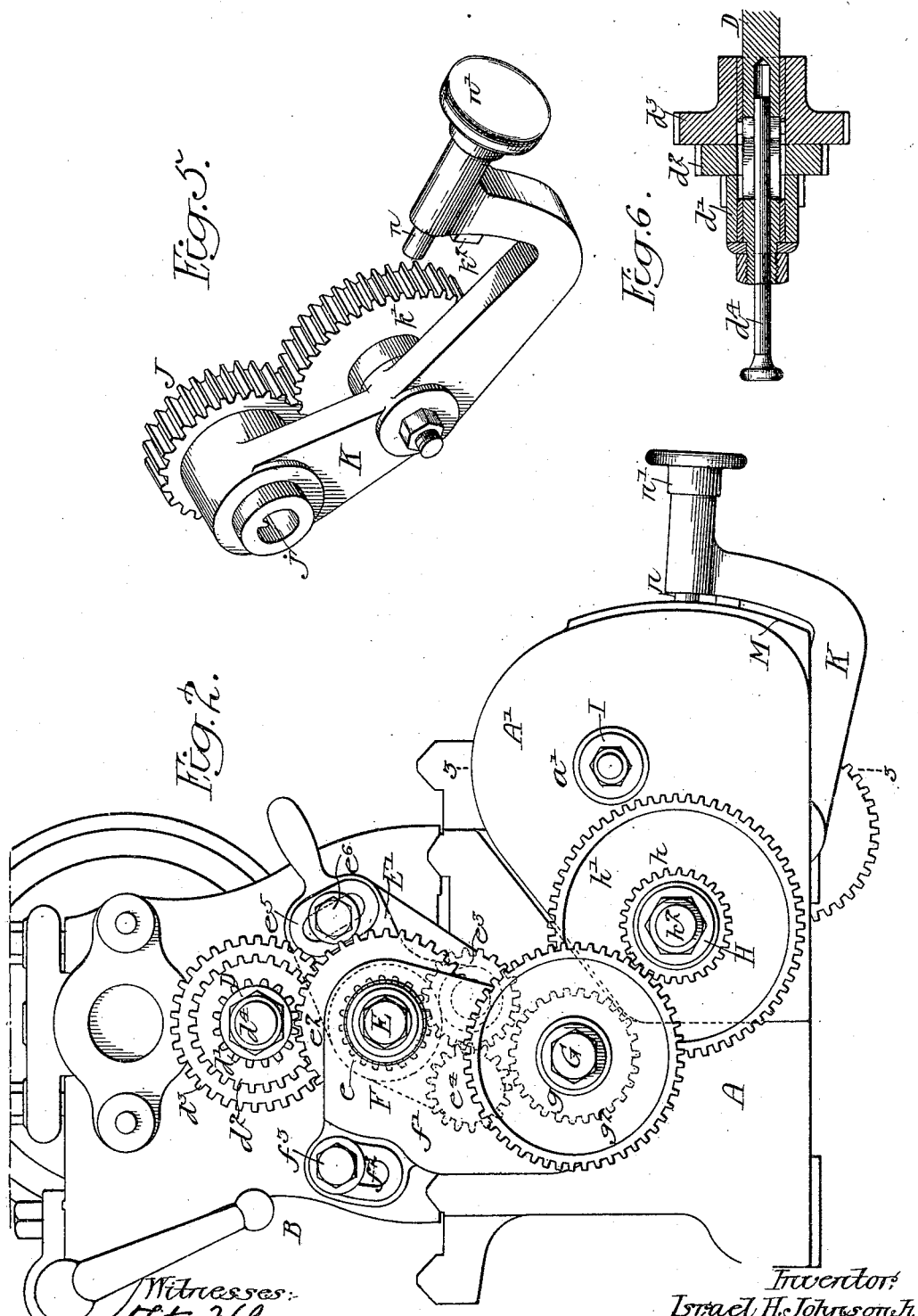

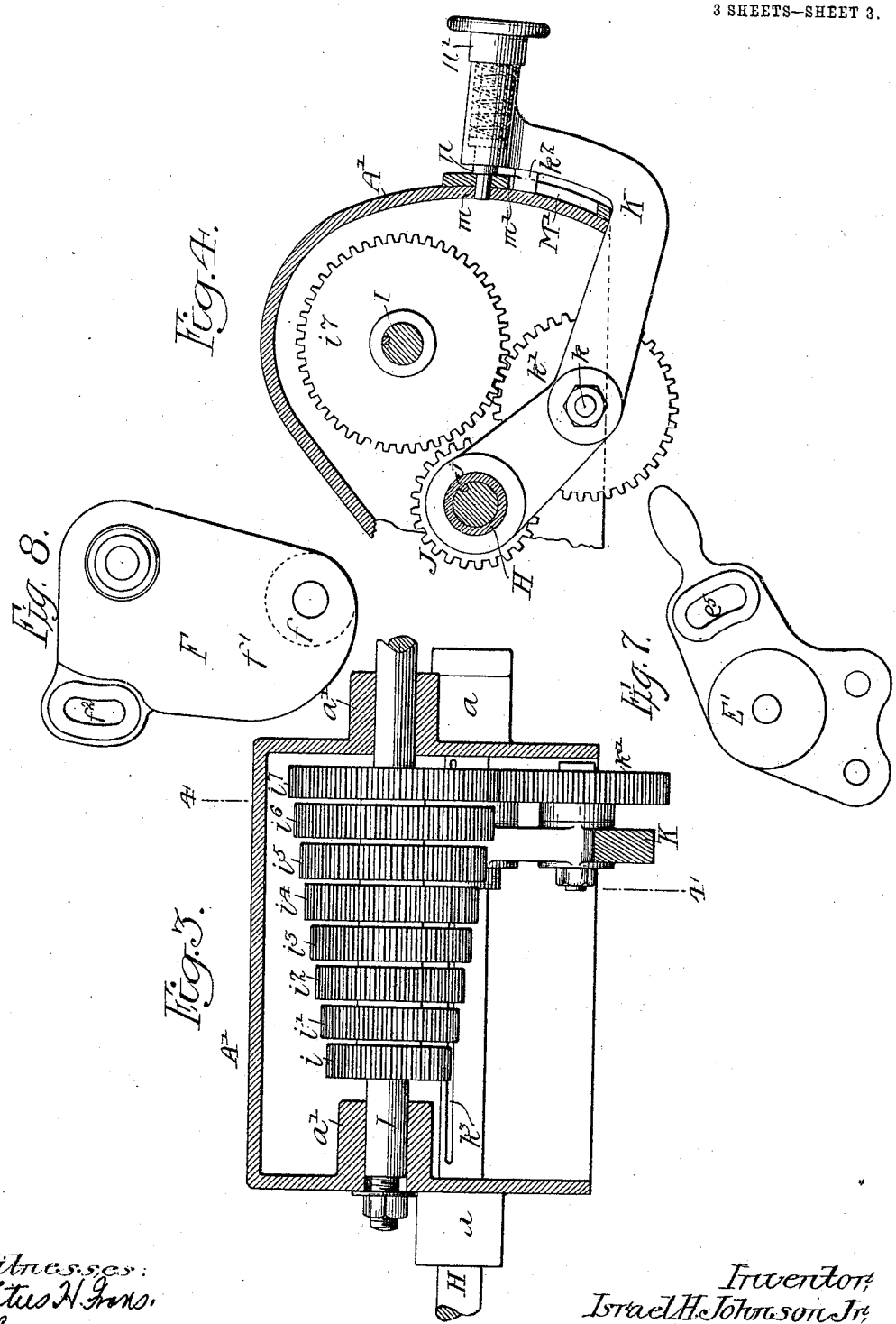

UNITED STATES PATENT OFFICE.

ISRAEL H. JOHNSON, JR., OF PHILADELPHIA, PENNSYLVANIA.

GEARING FOR LATHES OR OTHER TOOLS.

No. 807,274. Specification of Letters Patent. Patented Dec. 12, 1905.

Application filed March 2, 1904. Serial No. 196,170.

*To all whom it may concern:*

Be it known that I, ISRAEL H. JOHNSON, Jr., a citizen of the United States, residing in Philadelphia, Pennsylvania, have invented certain Improvements in Gearing for Lathes and other Tools, of which the following is a specification.

My invention relates to the feed mechanism of the tool-carriage of a lathe or other tool in which the speed of the moving part has to be varied according to the work.

The object of my invention is to make a compact and easily-operated change-gear by which any number of changes can be made very quickly and without detaching the gearing from the lathe. This object I attain in the following manner, reference being had to the accompanying drawings, in which—

Figure 1 is a side view of sufficient of the head-stock of a lathe to illustrate my invention. Fig. 2 is an end view of Fig. 1. Fig. 3 is a section on the line 3 3, Fig. 2. Fig. 4 is a section on the line 4 4, Fig. 3. Fig. 5 is a perspective view of a detail of the mechanism. Fig. 6 is a sectional view of the gearing of the first intermediate shaft. Fig. 7 is a detached view of the shifting lever, and Fig. 8 is a detached view of the swinging frame.

A is a portion of the bed-plate of the lathe. B is the head-stock having bearings for the spindle C, on which is mounted in the present instance the step-pulley C'.

$c$ $c'$ are the gear-wheels mounted on the spindle and meshing with the ordinary back gear of the lathe, which forms no part of my present invention.

$c^2$ is a pinion on the spindle, which meshes with a gear-wheel $d$ on the shaft D, having its bearings in the head-stock of the lathe. This shaft D is the first intermediate shaft.

When the spindle is driven from an electric or other motor, the step-pulley C' may be dispensed with and the spindle geared directly to the motor.

Loose on the shaft D are three gear-wheels $d'$ $d^2$ $d^3$, differing in diameter and each having a keyway for a key on the sliding rod $d^4$, extending through the center of the shaft D. By moving this rod so that its key will be in line with any of the gears $d'$ $d^2$ $d^3$ that particular gear will be made fast to the shaft and turn with it, while the other wheels will be loose thereon.

On a stud E is a gear-wheel $e$, secured to the hub of which are two gear-wheels $e'$ $e^2$. These three gear-wheels mesh with the gear-wheels $d'$ $d^2$ $d^3$, mentioned above. Pivoted to the stud E is a shifting lever E', carrying two gear-wheels of different diameters—in the present instance $e^3$ $e^4$. The lever E' is slotted at $e^5$, and passing through the slot is a bolt $e^6$, by which the lever can be locked in its adjusted position. The gear-wheels $e^3$ and $e^4$ intermesh, and the gear $e^3$ meshes with the gear $e$ on the stud E. Mounted on the stud E is a swinging frame F, consisting, in the present instance, of the main bearing $f$ and the two arms $f'$ $f''$. Carried by this frame F is a shaft G, on which is a gear-wheel $g$, which is in line with the wheels $e^3$ $e^4$, so that by shifting the lever E' either one of the gears $e^3$ $e^4$ will mesh with the gear-wheel $g$. When the lever is in mid-position, then the screw-shaft remains stationary, while the lathe-spindle rotates.

When the gear-wheel $e^3$ is in gear with the wheel $g$, then the drive is direct forward; but when the gear-wheel $e^4$ meshes with the wheel $g$ then the drive is indirect and the screw-shaft is reversed, as the gear-wheel $e$ drives first through the gear-wheel $e^3$ and then through $e^4$ to $g$.

The frame F is slotted at $f^2$, and passing through the slot is a screw-bolt $f^3$, tapped into the head-stock, so that the frame F can be locked in its adjusted position.

Secured to the shaft G is a gear-wheel $g'$ and a pinion $g^2$. The gear-wheel $g'$ meshes with the pinion $h$ on the shaft H, and the pinion $g^2$ meshes with the gear-wheel $h'$, also on the shaft H. These two wheels $h$ $h'$ are loose on the shaft and either one can be secured to it by a key on the slide-rod $h^2$, which enters keyways in either of the wheels, according to the position of the rod. The shaft H is mounted in bearings $a$ $a$ on the frame A', secured to the side of the bed-plate A of the lathe. Mounted in bearings $a'$, also on the frame A', is a shaft I, carrying a series of gear-wheels $i$ $i'$ $i^2$ $i^3$ $i^4$ $i^5$ $i^6$ $i^7$, as clearly shown in Fig. 3, all of different diameters and graduated from $i$ to $i^7$. All of these wheels are secured to the shaft I. The shaft H has a longitudinal groove or keyway $h^3$, and arranged to slide on the shaft is a gear-wheel J, the hub of said gear-wheel having a spline or key $j$, which extends into the keyway $h^3$, so that while the gearing J can slide on the shaft H it must turn with it. Mounted on the extended hub of the gear-wheel J is an arm K, made in the peculiar form shown in Figs. 4 and 5. On the stud $k$ on this arm is a gear-wheel $k'$, which meshes with the wheel J and can be moved into gear with any of the wheels $i$ to $i^7$ on the shaft I by first lowering the lever, shifting it to the desired position, and then raising it so that the wheel will mesh with the wheel with which it is in line. The arm K is so shaped that it will project from under the frame or casing A, which is shaped to inclose the gearing. Carried by the arm is a spring-actuated pin $n$, having a handhold $n'$. This pin is shaped so as to enter any of the holes $m$ in the plate M, secured to the face of the frame A'.

In order to bring the pin $n$ in line with any one of the holes $m$ and to also limit the movement of the arm K, I slot the plate M at M' and notch it at $m'$ directly under each hole, and on the arm is a lug $k^2$, which extends into the slot M' and when the lever is raised enters one of the notches $m'$. By this means the pin on the lever is brought into direct line with one of the holes $m$, and when it is released it will project into the hole and lock the lever in position, and its gear $k$ will mesh with one of the gears on the shaft I.

P is a screw-shaft mounted in suitable bearings $p$ on the bed-plate of the lathe. This screw-shaft is preferably in line with the shaft I, although in some instances it may be out of line with it, according to the type of lathe upon which the mechanism is used.

While in some cases the screw-shaft P may form a continuation of the shaft I, I preferably provide mechanism for reversing the screw-shaft or for throwing it out of gear entirely with the shaft I, so that the operator can always have complete control of the lathe, as this mechanism is situated at a point readily reached by the operator. On the shaft I is secured a bevel gear-wheel I', which meshes with the bevel gear-wheel S, having its bearing in the bed-plate of the lathe, and this wheel meshes with a bevel gear-wheel S', loose on the screw-shaft P. The bevel-wheels I' and S' each have clutch-teeth, and on an extension of the screw-shaft P is a clutch member P', having a key which enters a slot in the screw-shaft, so that the clutch member is free to slide longitudinally on the screw-shaft, but must turn with it. The clutch member P' has teeth at each end, which are arranged to mesh with the teeth on the bevel-wheels I' and S'. The position of the clutch member is controlled by a lever T, pivoted to a stud $t$, secured to the bed-plate of the machine, and at the handle end of the lever T is a bolt $t'$, actuated by a spring-lever $t^2$, which can enter any one of the three holes $u$, carried by a projection $u'$ on the bed-plate. When the lever T is in mid-position, then the clutch is free of both bevel-wheels and the screw-shaft is out of gear with the shaft I. When the clutch-sleeve is moved to mesh with the teeth on the bevel-wheel I', then the drive is direct, while if it is moved to the other position to mesh with the teeth of the bevel-wheel S' then the drive is indirect and the screw-shaft is reversed, the drive being through the bevel-wheels I', S, and S'.

It will be seen that by my invention I am enabled to make a great number of changes in the speed of the screw-shaft of a lathe or other feed-shaft of a machine. The quick changes can be made by operating the lever K so as to throw its wheel into mesh with any one of the number of gear-wheels on the shaft I, and by shifting the rod $d^4$ the gearing $d'$ $d^2$ $d^3$ can be changed and by shifting the rod $h^2$ the gearing $h$ $h'$ can be changed. A reverse can be made by shifting the lever E', if desired, and in some instances this lever may be dispensed with and the clutch mechanism controlled by the lever T used solely, or in some instances in small lathes the clutch mechanism may be dispensed with and the lever E' used.

I claim as my invention—

1. The combination in change-gearing, of a driving-shaft, a gear-wheel mounted on the shaft so as to turn with it but to slide thereon, an arm, a gear-wheel carried by the arm and meshing with the gear-wheel on the shaft, a driven shaft, a series of gears secured to said shaft, said gears differing in diameter, a casing inclosing the said gears, a perforated plate secured to the casing and having a series of notches corresponding to the gears, the said arm extending under the casing and having a portion bent relatively to the remainder, with a pin arranged to be projected into any one of the perforations in the plate, and a lug also on the arm arranged to enter any one of the notches to bring the arm in proper alinement with a perforation and with the gear corresponding thereto, substantially as described.

2. The combination of a driving-shaft having a longitudinal groove therein, a gear-wheel mounted on the shaft and having a spline entering the groove so that the gear-wheel will turn with but slide on the shaft, an arm mounted on the extended hub of the gear-wheel and bent substantially as described, a driven shaft, a series of gears secured to said shaft, said gears differing in diameter, an independent casing inclosing the gears and having the bearings for the two shafts, a stud on the arm, a gear-wheel carried by the stud and meshing with the gear-wheel on the driving-shaft, said gear-wheel on the stud being movable to mesh with any one of the gears on the driven shaft, said arm extending under the frame, a notched and perforated plate secured to the frame, a lug on the arm arranged to enter the notches and to limit the movement of the arm, and a pin carried by the arm and arranged to enter any one of the perforations in the plate, substantially as described.

3. The combination in change-gearing of a driving-spindle, means operatively connecting said spindle and shaft including a driven shaft, a series of gears differing in diameter, a shaft, a gear splined to said shaft and arranged to slide thereon, an arm, an intermediate gear carried thereby and arranged to mesh with any one of a series of gears and with the gear on the spline-shaft, means for adjusting said arm, with a plurality of sets of change-gearing between said mechanism and the driving-spindle, each of said sets including a plurality of shafts, intermeshing gears, of which certain are loose on their shaft, a sliding rod, and a key for connecting any one of the loose gears with its shaft, substantially as described.

4. The combination in change-gearing of a driving-spindle, a driven shaft, a series of gears differing in diameter, a shaft, a gear splined to said shaft and arranged to slide thereon, an arm, an intermediate gear carried thereby and arranged to gear with any one of the series of gears and with the gear on the spline-shaft, means for adjusting said arm, two sets of change-gearing between the said mechanism and the driving-spindle, and reverse mechanism between said two sets of change-gearing, substantially as described.

5. The combination in change-gearing of a supporting-frame, a driving-spindle, a shaft geared to the said spindle, three change-gears loosely mounted on the shaft, a key-rod constructed to lock any one of the gears to the said shaft, a stud mounted on the frame, three gears loose on the said stud and meshing with the three gears on the shaft, a reverse-lever, two gears therefor, means for locking the reverse-lever in position, a bearing-frame, a shaft carried thereby, a gear-wheel for said shaft constructed to mesh with either one of the wheels on the reverse-lever, a gear-wheel and a pinion on the said shaft, an intermediate shaft, a gear-wheel and pinion loose thereon, a key-rod constructed to lock either the gear or pinion to the shaft, said shaft having a keyway, a gear-wheel mounted on said intermediate shaft, a key entering said keyway so that it will turn with the shaft but be free to slide thereon, an arm pivoted to the shaft, an intermediate gear carried by said arm, a driven shaft, a series of gears differing in diameter on said shaft, said arm being movable to bring its gear into line with any one of the gears, and means for locking the arm in position, substantially as described.

6. The combination in change-gearing, of a driving-spindle, a shaft geared to the said spindle, three change-gears loosely mounted on the shaft, a key-rod constructed to lock any one of the gears to the said shaft, a stud, three gears loose on the said stud and meshing with the three gears on the shaft, a reverse-lever, two gears therefor, means for locking the reverse-lever in position, a bearing-frame, a shaft carried thereby, a gear-wheel for the shaft placed to mesh with either one of the gears of the reverse-lever, a gear-wheel and a pinion on the said latter shaft, an intermediate shaft, a gear-wheel and pinion loose thereon, a key-rod constructed to lock either the gear or pinion to the shaft, said shaft having a keyway, a gear-wheel mounted on said shaft, a key for said wheel entering the keyway so that it will turn with the shaft but be free to slide thereon, an arm pivoted to the shaft, an intermediate gear carried by said arm, a driven shaft, a series of gears differing in diameter therefor, said arm being movable to bring its gear into line with any one of the gears, and means for locking the arm in position, a screw-shaft and reversing mechanism between the screw-shaft and the driven shaft, substantially as described.

In testimony whereof I have signed my name to this specification in the presence of two subscribing witnesses.

ISRAEL H. JOHNSON, JR.

Witnesses:
WILL. A. BARR,
JOS. H. KLEIN.